US009190725B2

(12) United States Patent  
Hernandez et al.

(10) Patent No.: US 9,190,725 B2  
(45) Date of Patent: Nov. 17, 2015

(54) TEST SYSTEM HAVING TEST STATIONS WITH ADJUSTABLE ANTENNAS

(71) Applicant: Apple Inc., Cupertino, CA (US)

(72) Inventors: Diego C. Hernandez, Foster City, CA (US); Indranil Sen, Santa Clara, CA (US); Chun-Lung Chen, Sunnyvale, CA (US); Javier Gomez Tagle, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 13/787,515

(22) Filed: Mar. 6, 2013

(65) Prior Publication Data

US 2014/0256373 A1 Sep. 11, 2014

(51) Int. Cl.
*H04B 17/00* (2015.01)
*H01Q 3/26* (2006.01)
*H04B 17/12* (2015.01)
*H04B 17/27* (2015.01)

(52) U.S. Cl.
CPC ............... *H01Q 3/267* (2013.01); *H04B 17/12* (2015.01); *H04B 17/27* (2015.01)

(58) Field of Classification Search
CPC ........ H04W 24/00; H04B 17/00; G01R 29/00
USPC ........................................... 455/67.11, 67.12
See application file for complete search history.

(56) References Cited

U.S. PATENT DOCUMENTS

| 7,477,877 | B2 | 1/2009 | Bednasz et al. |
| 7,969,367 | B2 | 6/2011 | Mauksch |
| 8,331,869 | B2 | 12/2012 | Foegelle |
| 2005/0282495 | A1* | 12/2005 | Forster ........................ 455/41.2 |
| 2006/0068713 | A1* | 3/2006 | Chang ........................ 455/67.11 |
| 2008/0056340 | A1* | 3/2008 | Foegelle ....................... 375/224 |
| 2008/0303725 | A1 | 12/2008 | Hackenbroich et al. |
| 2011/0102275 | A1* | 5/2011 | Partee et al. ................... 343/703 |
| 2012/0221277 | A1* | 8/2012 | Gregg et al. ................... 702/106 |
| 2013/0033279 | A1 | 2/2013 | Sozanski et al. |
| 2013/0044033 | A1* | 2/2013 | Nickel et al. .................. 343/703 |

* cited by examiner

*Primary Examiner* — Lewis West
*Assistant Examiner* — Dong-Chang Shiue
(74) *Attorney, Agent, or Firm* — Treyz Law Group; G. Victor Treyz; Michael H. Lyons

(57) ABSTRACT

A test system may include a master test station and slave test stations. The test stations may receive devices under test such as portable wireless electronic devices. Each test station may have adjustable antenna structures coupled to test equipment. The adjustable antenna structures may include antenna support structures on which test antennas are mounted and rail along which the antenna support structures and test antennas are moved by a pneumatic positioner. A rotatable platform may be provided in each test station to support the device under test in that test station. By making a series of over-the-air test measurements in the master test station while adjusting the antenna system and device positioning system, a satisfactory location for the active test antenna and device position may be identified. This configuration may then be used in performing single-point over-the-air tests in the slave test stations.

14 Claims, 11 Drawing Sheets

TEST SYSTEM HAVING TEST STATIONS WITH ADJUSTABLE ANTENNAS

BACKGROUND

This relates to electronic devices and, more particularly, to systems for testing wireless electronic devices.

Electronic devices such as cellular telephones and other portable devices are often provided with wireless circuitry. For example, cellular telephones contain wireless radio-frequency transceiver circuitry for communicating using cellular telephones bands. Electronic devices may also contain circuitry for communicating using wireless local area network communications bands and other communications bands of interest.

During manufacturing, wireless tests are performed on electronic devices to ensure that the devices are operating satisfactorily. For example, single-point over-the-air tests are performed with an antenna in a single fixed position within a wireless test chamber to determine whether devices exhibit desired levels of wireless receiver sensitivity or other performance characteristics under a variety of operating conditions. In a typical over-the-air test of this type, a wireless electronic device under test is placed within a test chamber to allow wireless measurements to be made. Using trial and error, the device can be manually positioned relative to a test antenna in the test chamber until the device has been oriented properly to allow the test antenna to gather sufficiently strong signals for wireless test measurements. This type of manual process can be cumbersome and prone to error.

It would therefore be desirable to be able to provide improved testing systems for wireless electronic devices.

SUMMARY

A test system may include a master test station and slave test stations. The test stations may receive devices under test such as portable wireless electronic devices. Wireless testing may be performed on the devices under test to determine whether the devices under test are performing satisfactorily.

Each test station may have adjustable antenna structures coupled to test equipment. The adjustable antenna structures may include antenna support structures on which multiple test antennas are mounted. There may be three or more test antennas such as three or more patch antennas. Each antenna may be coupled to the test equipment using switching circuitry and transmission lines. The switching circuitry may be controlled by the test equipment so that the test equipment can switch a desired antenna into use. The antenna support structures may slide within a rail. The position of the antenna support structures and the test antennas along the rail may be controlled using a pneumatic positioner. A rotatable platform may be provided in each test station to support the device under test in that test station.

By making a series of over-the-air test measurements in the master test station while adjusting the antenna system and device positioning system, a satisfactory location for the active test antenna and device position within the test station may be identified. This configuration may then be used in performing single-point over-the-air tests in the slave test stations.

Further features of the invention, its nature and various advantages will be more apparent from the accompanying drawings and the following detailed description of the preferred embodiments.

DETAILED DESCRIPTION

Wireless testing may be performed on electronic equipment that communicates using wireless signals. The electronic equipment that is being tested may sometimes be referred to as a wireless electronic device or device under test.

Figure 1:
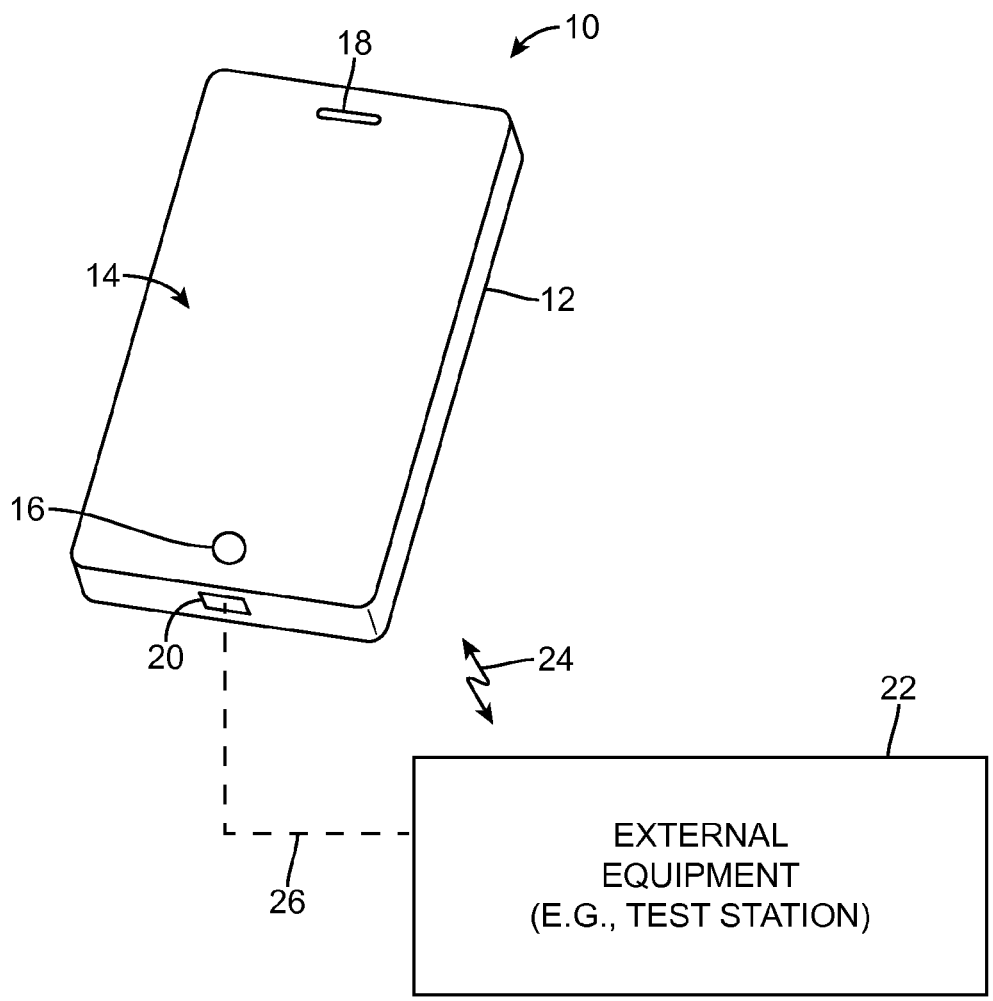
FIG. 1 is a front perspective view of an illustrative electronic device of the type that may be tested using a wireless test system in accordance with an embodiment of the present invention.

An illustrative electronic device of the type that may be wirelessly tested is shown in FIG. 1. Device 10 of FIG. 1 may be a handheld device such as a cellular telephone or media player, a tablet computer, a notebook computer, other portable computing equipment, a wearable or miniature device such as a wristwatch or pendant device, a television, a computer monitor, a computer integrated into a computer display, a set-top box, a wireless access point, a desktop computer, or other electronic equipment.

As shown in FIG. 1, electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16 and an opening such as opening 18 may be used to form a speaker port. Device configurations without openings in display 14 may also be used for device 10.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Device 10 may have one or more connector ports such as connector port 20. Connector port 20 may have a male connector, a female connector, or may form part of a symmetrical connector. Devices under test such as device 10 of FIG. 1 may have any suitable number of connectors 20, may have any suitable number of contacts in each connector 20, and may have connectors 20 of any suitable shape (e.g., audio jack format, data port format, Universal Serial Bus format, etc.). Using connector port 20 and optional wired path 26, external equipment 22 may communicate with device 10. External equipment 22 also communicates wirelessly with device 10, as indicated by wireless signals 24. External equipment 22 may include computing equipment, peer devices, test system equipment, etc. During testing operations, external equipment 22 such as test equipment may be used in performing wireless tests on device 10. For example, external equipment 22 may be associated with a wireless test station in a test system.

Wireless testing may be performed in a test chamber. If desired, power can be provided to devices under test using cables and cables can be used to communicate with devices under test. For example, devices under test may be tethered to cables within a test chamber. Often, however, it may be desirable to perform tests without any attached cables. If cables are attached to a device under test during testing, the cables may electromagnetically influence radio-frequency signals in the vicinity of the device under test and lead to potentially inaccurate test results.

In order to wirelessly test a device under test in a wireless test chamber without any attached cables, devices under test may be powered with batteries. For example, a cellular telephone or tablet computer that is being wirelessly tested may use internal battery power to operate radio-frequency transceiver circuitry within the device under test.

To enhance testing efficiency, automated processes may be used to make adjustments within a test system that is being used to test the devices under test. As an example, a set of devices under test can be loaded into a series of test stations that are automatically placed in satisfactory configurations to support desired wireless tests. This allows devices under test to be tested efficiently with little or no intervention from an operator. The tests that are performed this way may be single-point over-the-air tests in which a test antenna that is located at a single fixed point within the test chamber is used to make measurements such as receiver sensitivity measurements. The receiver sensitivity measurements or other over-the-air test measurements may sometimes be made both in the presence and in the absence of potential interference from a component in device 10 such as display 14 to determine whether or not the component can be operated without degrading device performance by an unacceptable amount.

Figure 2:
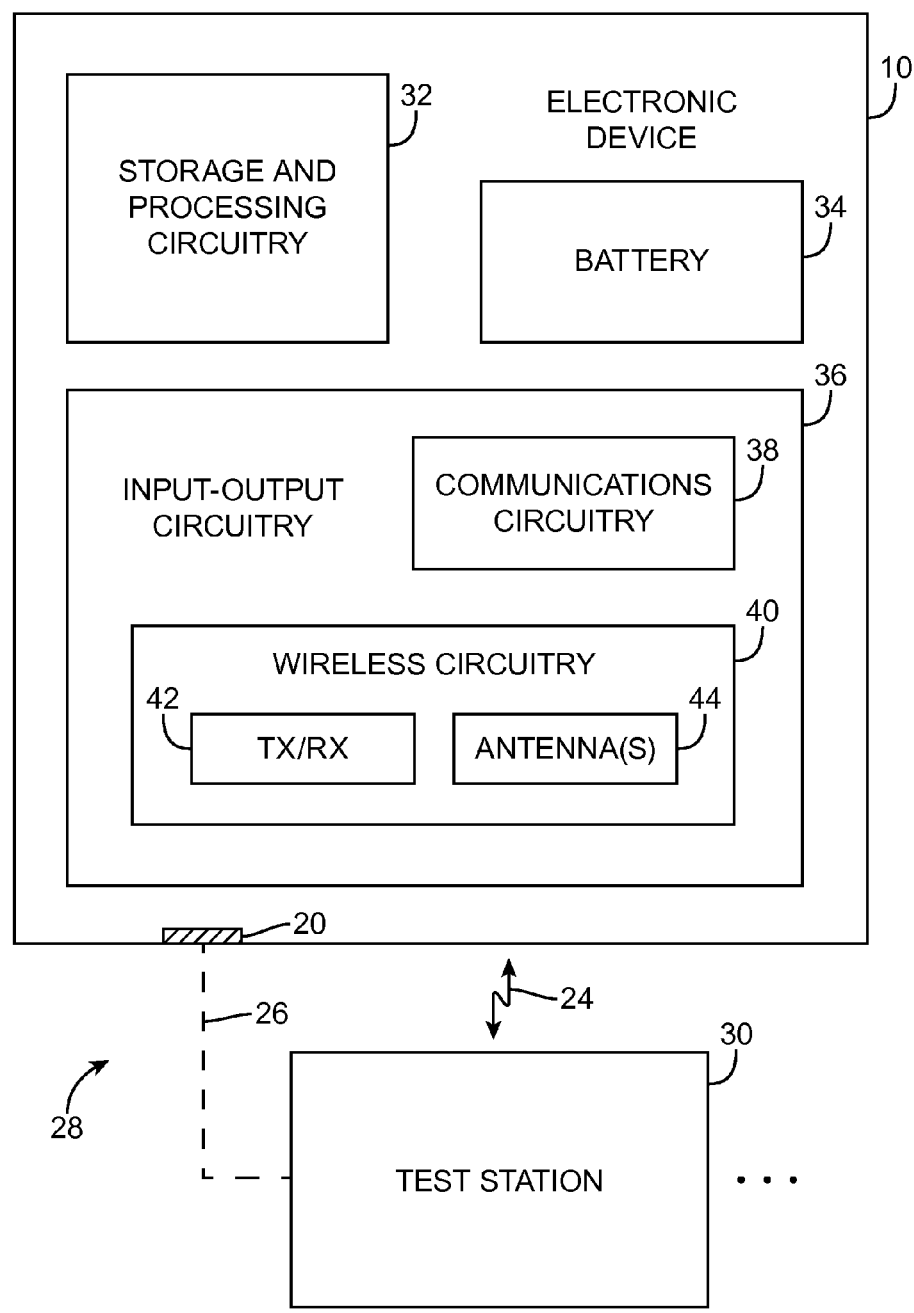
FIG. 2 is a schematic diagram of an illustrative wireless test station and an associated wireless electronic device under test in accordance with an embodiment of the present invention.

FIG. 2 is a diagram of illustrative test system equipment that may be used in testing device under test 10. As shown in FIG. 2, test system 28 may include test stations such as test station 30 for use in testing devices under test such as device under test 10. Test stations 30 may include adjustable test antennas, positioning equipment for positioning a device under test, and test equipment for controlling test operations and gathering test data. Test stations such as test station 30 may be coupled to device under test 10 using an optional wired path such as wired path 26 or wired path 26 may be omitted during testing to avoid interfering with wireless test measurements. Wireless signals 24 (e.g., wireless test signals) may be conveyed wirelessly between device under test 10 and test station 30 during testing.

Device under test 10 may include storage and processing circuitry 32. Storage and processing circuitry 32 may include one or more processors such as microprocessors, microcontrollers, control circuits that are part of application-specific integrated circuits, audio integrated circuits, and other control circuitry. Storage and processing circuitry 32 may also include memory integrated circuits, hard disk drives, solid state drives, removable storage media, and other components for storing data.

Device 10 may receive power from external sources (e.g., alternating current or direct current power may be received via connector 20) and may use power management circuitry to provide corresponding internal power to battery 34 and the other components of device 10. Power management circuitry in device 10 may also be used to provide power from battery 34 to external accessories that are coupled to device 10 and to internal device components.

Input-output circuitry 36 may include buttons, sensors, light-emitting components such as status indicator lights, audio components such as microphones and speakers, touch screen displays, displays without touch functionality, touch pads, keyboards, and other input-output components. Wired communications circuitry such as circuitry 38 may include transmitter and receiver circuitry for conveying data over wired communications paths such as optional path 26 (e.g., serial and/or parallel bus data paths coupled to connector 20, etc.). Communications circuitry 38 may, for example, include Universal Serial Bus communications circuitry that is coupled to contacts in connector 20.

Wireless circuitry 40 may include radio-frequency transceiver circuitry 42 and antenna structures 44. Radio-frequency transceiver circuitry 42 may include cellular telephone transceiver circuitry, wireless local area network transceiver circuitry (e.g., IEEE 802.11 circuitry), and satellite navigation system receiver circuitry (e.g., a receiver for receiving Global Positioning System signals). Wireless circuitry 40 may also include near field communications circuitry, circuitry for receiving radio signals, television signals, and paging signals, and transceiver circuitry for handling other communications bands of interest.

Antenna structures 44 may include one or more antennas such as inverted-F antennas, planar inverted-F antennas, patch antennas, monopole antennas, dipole antennas, loop antennas, closed and open slot antennas, antennas of other designs, and hybrid antennas that are formed from one or more antenna resonating element structures such as these. There may be one antenna in device 10, more than one antenna in device 10, two or more antennas in device 10, three or more antennas in device 10, or four or more antennas in device 10.

Test station 30 may include one or more test antennas. The test antennas may transmit wireless signals 24 that are received by antennas 44 of device 10 and may receive wireless signals 24 that are transmitted by antennas 44 of device 10. The test antennas of test station 30 may be organized in an array and/or may be mounted on movable equipment (e.g., a pneumatically controlled rail system) that allows the antennas to be moved into a variety of different orientations with respect to device under test 10. Device under test 10 may also be positioned using a computer-controlled positioner during use of system 28. A rotatable platform such as a round turntable or other support structure may, for example, be controlled using a controller associated with test station 30.

Figure 3:
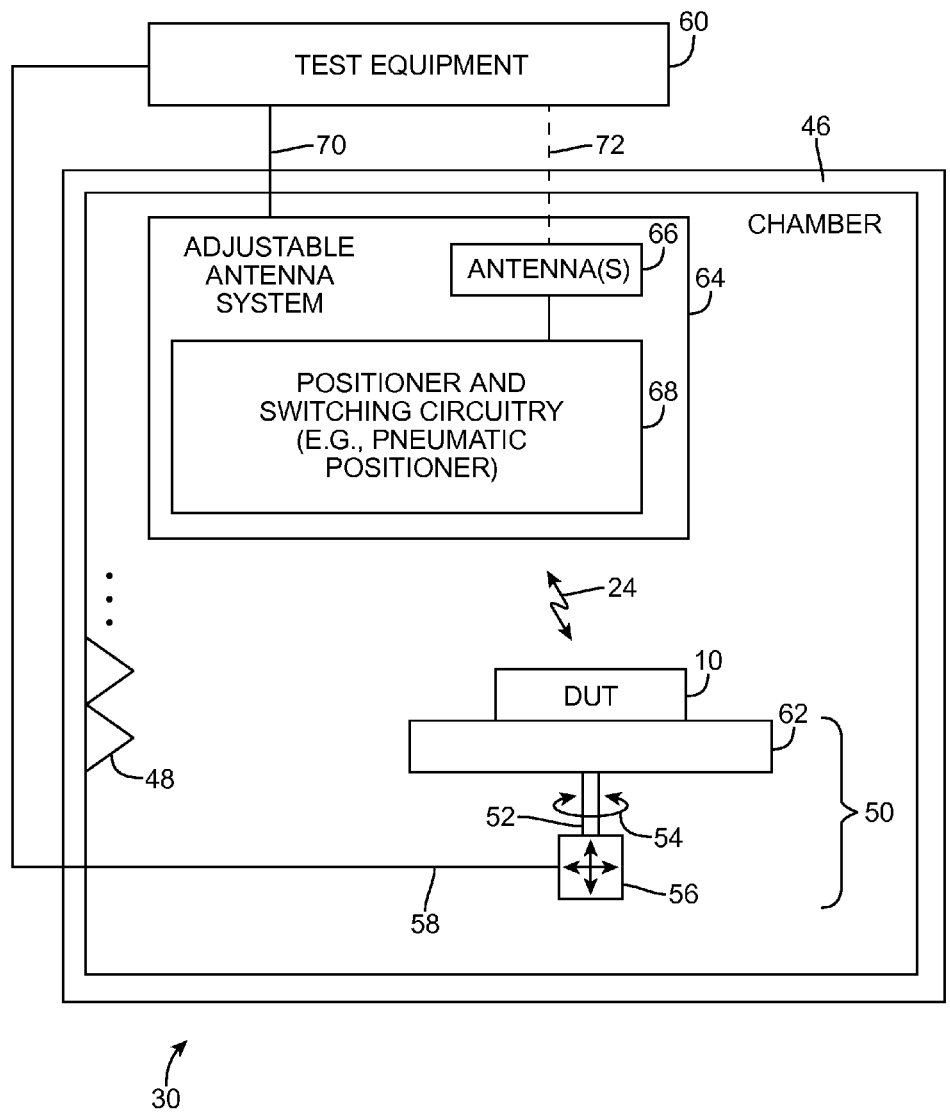
FIG. 3 is a diagram of an illustrative wireless test station having an adjustable antenna system and device positioning equipment in accordance with an embodiment of the present invention.

FIG. 3 is a diagram of an illustrative test station such as test station 30 of FIG. 2. As shown in FIG. 3, test station 30 may include a chamber such as chamber 46. Chamber 46 may have metal sidewalls to prevent wireless interference from escaping from the interior of chamber 46 and to prevent wireless interference from outside of chamber 46 entering into the interior of chamber 46. The inner surface of the walls of chamber 46 may be lined with pyramidal absorbers such as pyramidal anechoic chamber wall absorbers 48 to suppress reflections of internal signals that might otherwise have a potential to interfere with the wireless measurements being made.

Device under test 10 may be supported by computer-controlled positioning structures such as positioning system 50. In the example of FIG. 3, positioning system 50 includes rotatable disk-shaped platform 62. Platform 62 is mounted on rotating shaft 52. Positioner 56 may rotate shaft 52 in directions 54 using positioner 56 in response to control signals received from test equipment 60 over path 58. If desired, positioner 56 may be used to translate device under test 10 or perform other positioning operations.

Test station 30 may include adjustable antenna system 64. Adjustable antenna system 64 may include one or more antennas such as test antennas 66. Test antennas 66 may be used in transmitting wireless radio-frequency signals 24 to device under test 10 for reception by a receiver in radio-frequency transceiver circuitry 42. Test antennas 66 may also be used in receiving wireless radio-frequency signals 24 that have been transmitted by transceiver circuitry 42 to test equipment 60. Test circuitry within test equipment 60 such as vector network analyzer equipment, power meter equipment, call box equipment, and other test equipment may be used in performing wireless tests with device under test 10 (e.g., signal strength tests, etc.). Test equipment 60 and antennas such as antenna 66 may be coupled to each other using coaxial cables or other transmission line structures 72.

Adjustable antenna system 64 may include positioner equipment and switching circuitry 68 containing one or more positioners for positioning antennas 66 relative to device under test 10 and containing radio-frequency switching circuitry for routing radio-frequency signals to and from a selected antenna within an array of multiple antennas 66. Positioner and switching circuitry 68 may include a positioner such as pneumatic positioning equipment, motor-driven positioning equipment, solenoid-based actuators, or other equipment for adjusting the position of antennas 66 relative to device under test 10 in response to control signals from test equipment 60 received using path 70. Positioner and switching circuitry 68 may also include switches or other adjustable switching circuitry that can be configured to switch a selected one of antennas 66 into use (e.g., by coupling that antenna to an appropriate transmission line path in path 72).

Figure 4:
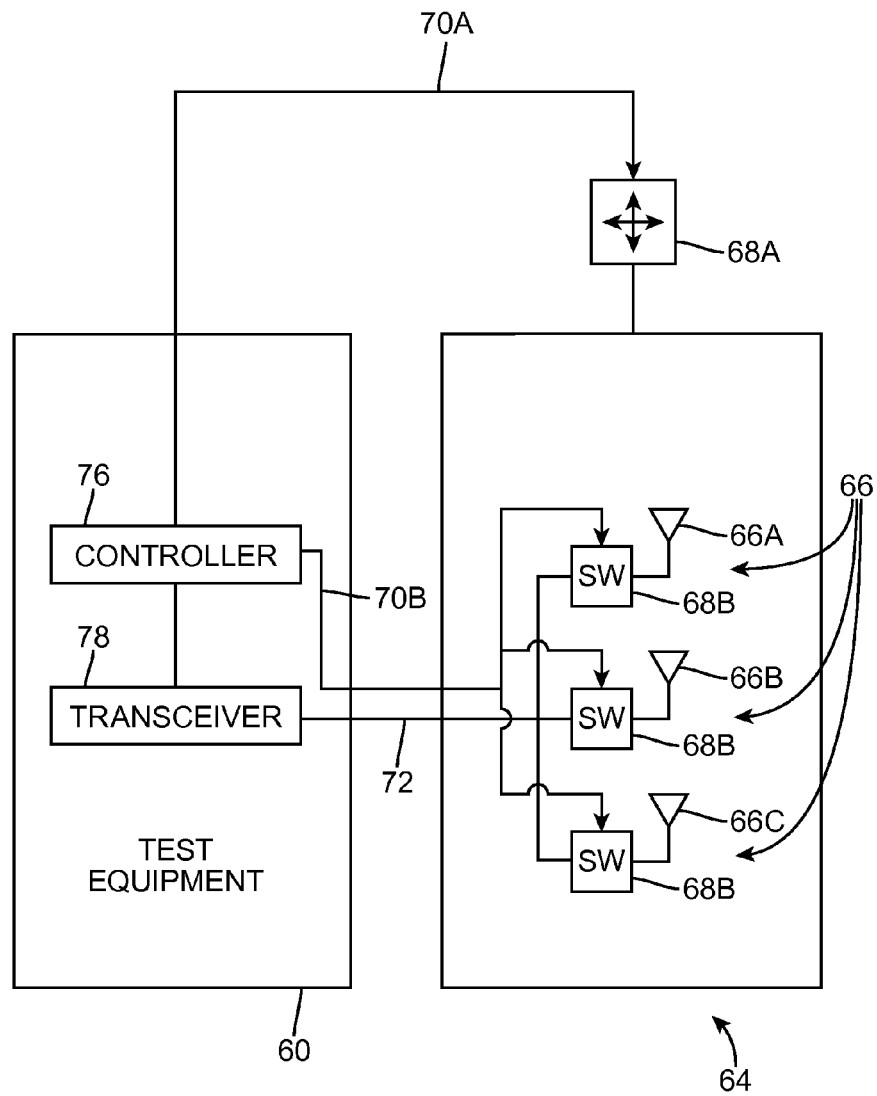
FIG. 4 is a diagram showing how a test station may be provided with an antenna system that can be adjusted using positioning and switching circuitry in accordance with an embodiment of the present invention.

FIG. 4 is a diagram of illustrative adjustable antenna system 64 and test equipment 60 in a configuration in which adjustable antenna system 64 has three test antennas 66 (i.e., test antenna 66A, 66B, and 66C). Test equipment 60 may include radio-frequency transceiver circuitry for generating and receiving radio-frequency test signals. Transmission line path 72 may be used in conveying radio-frequency signals between transceiver 78 and antennas 66.

Switching circuitry 68B may be configured in response to control signals received from test equipment controller 76 via control path 70B. If, for example, test equipment 60 desires to switch antenna 66A into use, the uppermost switch 68B in FIG. 4 may be turned on while remaining switches 68B may be turned off. This switches antenna 66A into use and switches antennas 66B and 66C out of use.

Controller 76 can also issue control commands to positioner 68A using control path 70A. Positioner 68A may include a pneumatically controlled actuator or other positioner for adjusting the position of antennas 66 within chamber 46 relative to device under test 10. The positioner may be, for example, a pneumatic positioner that slides antennas 66 along a rail or other linear positioning structure.

Figure 5:
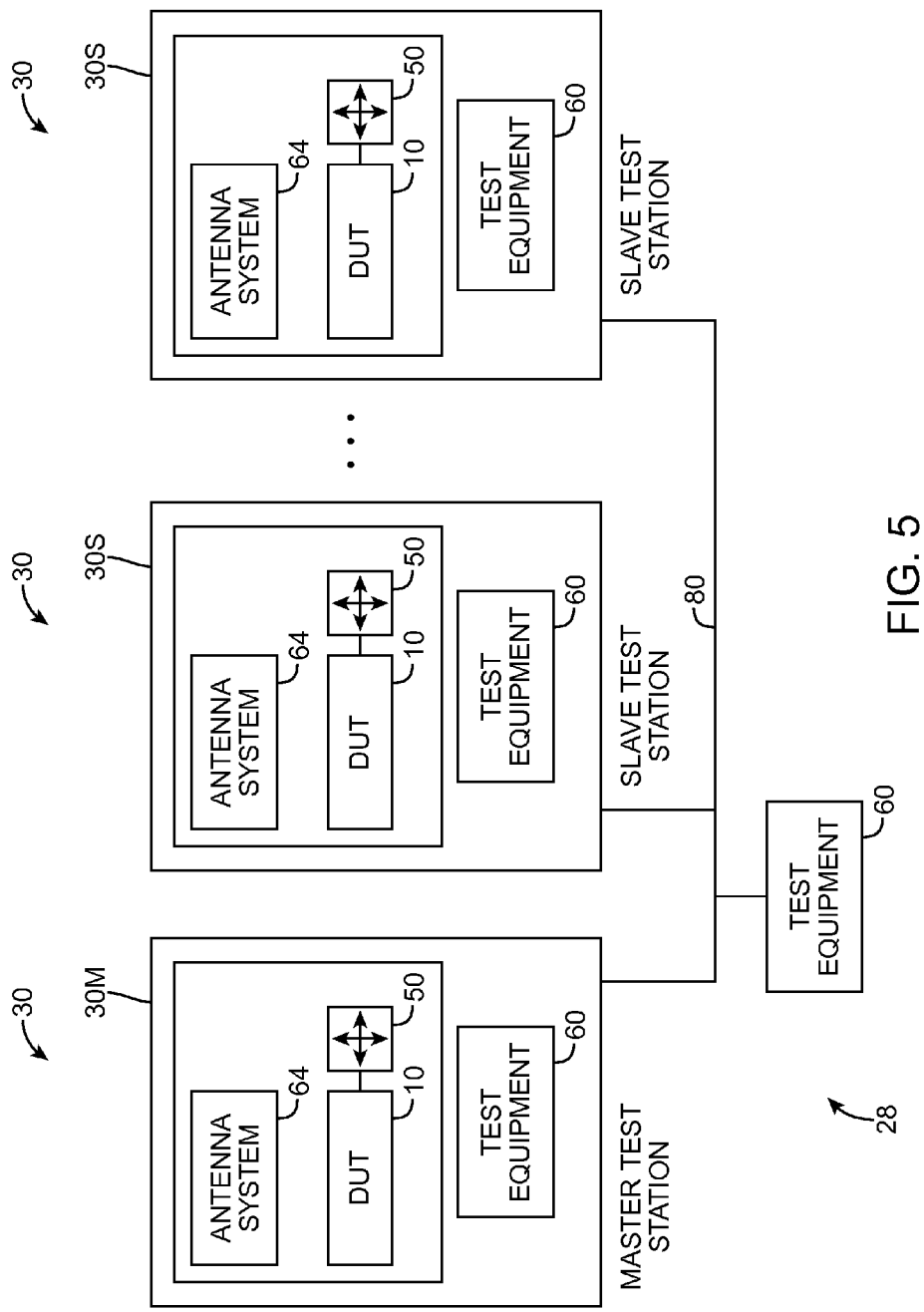
FIG. 5 is a diagram of a test system having a master test station and multiple associated slave test stations in accordance with an embodiment of the present invention.

There may be more than one test station 30 in test system 28. As shown in FIG. 5, for example, test stations 30 may include a master test station such as master test station 30M and multiple associated slave test stations such as slave test stations 30S. Each test station may be loaded with a corresponding device under test 10. An adjustable antenna system 64 and adjustable device positioning system 50 in each test station may be controlled by associated test equipment 60 to ensure that wireless tests can be performed satisfactorily.

With one illustrative arrangement, master test station 30M can make a series of adjustments to the position of antennas 66, the selection of which antenna 66 is being switched into use, and the position of device 10 within chamber 46 until a satisfactory configuration for use in single-point over-the-air wireless tests with a fixed-position antenna and fixed-position device under test has been identified. In this satisfactory configuration, signal strengths are sufficiently high to make accurate measurements of parameters such as receiver sensitivity, etc. After identifying the satisfactory configuration for making wireless over-the-air test measurements, test equipment 60 may configure each antenna system 64 and positioning system 50 in slave test stations 30S in the same way, so that devices under test 10 in the slave test stations can be tested using the same satisfactory configuration. Test equipment 60 may include test equipment at master test station 30M, test equipment at slave test stations 30M, and other test equipment. Test equipment 60 may be interconnected using wired and wireless communications paths such as paths 80. Computing equipment (e.g., one or more computers, embedded processors, application-specific integrated circuits, test units, or other equipment) may be used in test equipment 60 to perform functions such as data acquisition, control of antennas and positioners, data analysis, control of slave test stations, etc.

Figure 6:
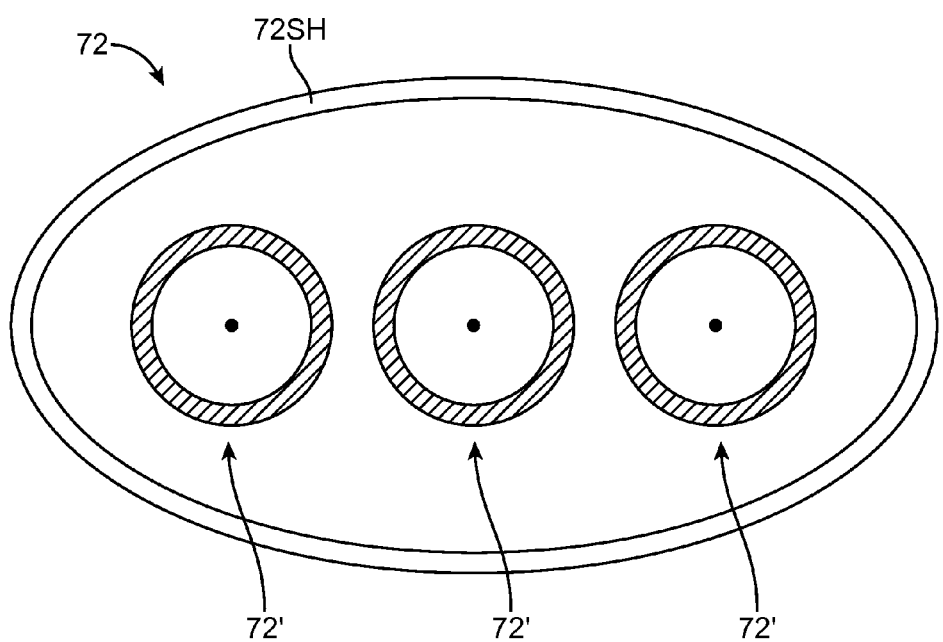
FIG. 6 is a cross-sectional view of an illustrative cable containing multiple individual antenna cables in accordance with an embodiment of the present invention.

FIG. 6 is a cross-sectional side view of transmission line cable 72 in a configuration in which multiple coaxial cables 72' have been routed within the interior of a larger cable structure 72SH. This type of cabling may be used to couple three respective antennas 66 such as antennas 66A, 66B, and 66C to test equipment 60. A first one of cables 72' in cable 72 may be coupled between test equipment 60 and a first of switches 68B in adjustable antenna system 64 of FIG. 4, a second one of cables 72' in cable 72 may be coupled between test equipment 60 and a second of switches 68B in adjustable antenna system 64 of FIG. 4, and a third one of cables 72' in cable 72 may be coupled between test equipment 60 and a third of switches 68B in adjustable antenna system 64 of FIG. 4. Cables such as cable 72 of FIG. 6 may be provided with other numbers of coaxial cables or with transmission lines of other types. The configuration of FIG. 6 is merely illustrative.

Figure 7:
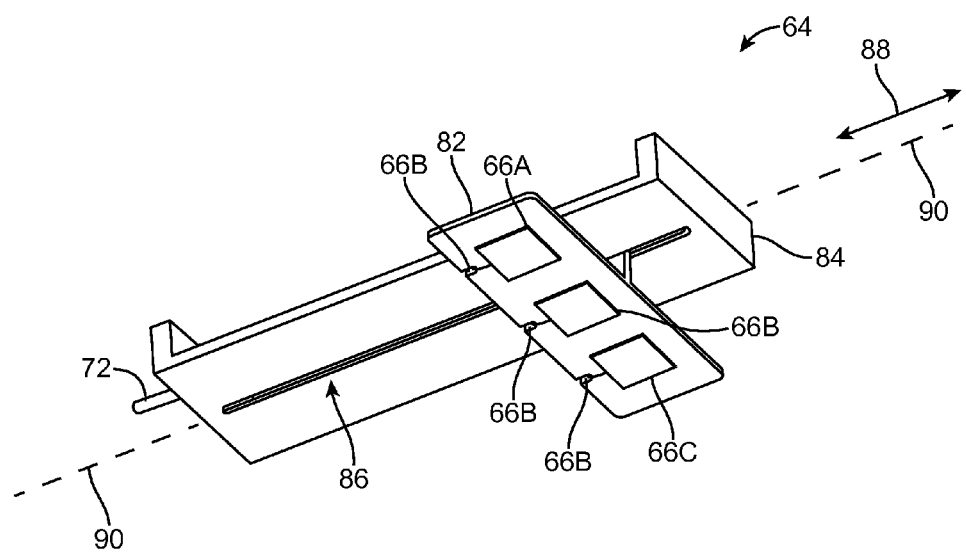
FIG. 7 is a bottom perspective view of an illustrative adjustable antenna system having multiple movable antennas that can slide along a rail in accordance with an embodiment of the present invention.

FIG. 7 is a bottom perspective view of an illustrative adjustable antenna system. As shown in FIG. 7, adjustable antenna system 64 of FIG. 7 has three patch antennas 66A, 66B, and 66C. In general, test antennas 66 may be inverted-F antennas, loop antennas, monopole antennas, dipole antennas, slot antennas, other antennas, hybrid antennas that are formed form antennas of two or more of these types, etc. Switches 68B may be used in selectively coupling a desired one of the antennas into use. Because each patch antenna is located in a different position within chamber 46 relative to device under test 10, the ability to select a desired antenna provides the test system with an opportunity to optimize signal strength.

Antenna support structure 82 may be formed from a planar substrate member. Antenna support structures 84 may form a rail with a slot such as slot 86 that is aligned with longitudinal axis 90 of antenna support structures 84. A vertical fin that extends from support structures 82 may pass through slot 86. During operation, the fin may slide within slot 86 in directions 88, so that the position of support structures 82 may be adjusted along longitudinal axis 90 of the rail. A pneumatic positioner (see, e.g., positioner 68 of FIG. 3) may be used in controlling the linear position of support structures 82 along rail 84.

Figure 8:
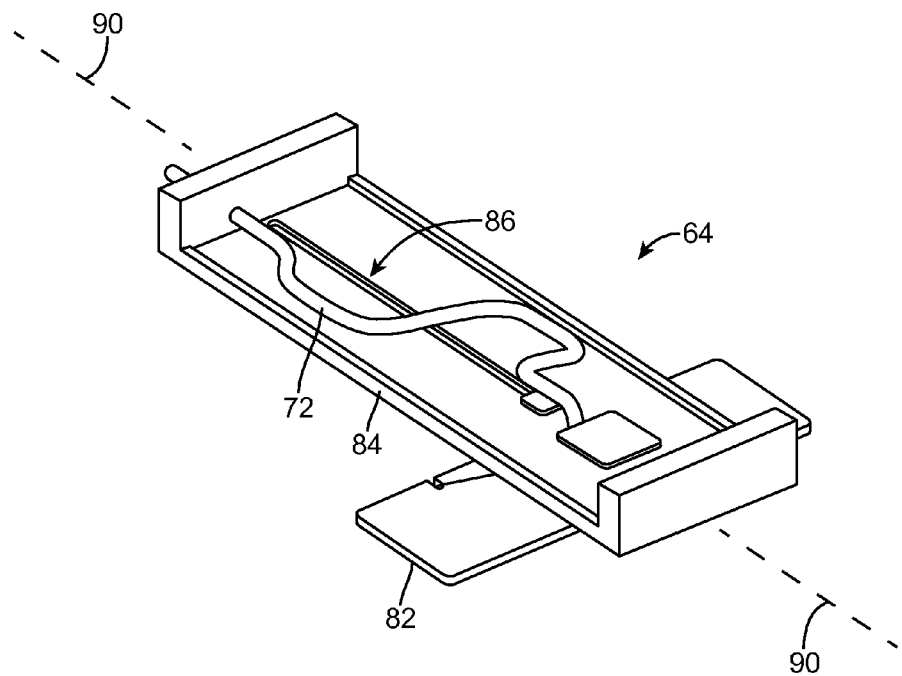
FIG. 8 is a top perspective view of the illustrative adjustable antenna system of FIG. 7 in accordance with an embodiment of the present invention.

FIG. 8 is a top perspective view of adjustable antenna support structures 64, showing how cable 72 may be provided with a meandering path to allow movement of antennas 66 and support structures 82 along axis 90 without over-stretching the cable.

Figure 9:
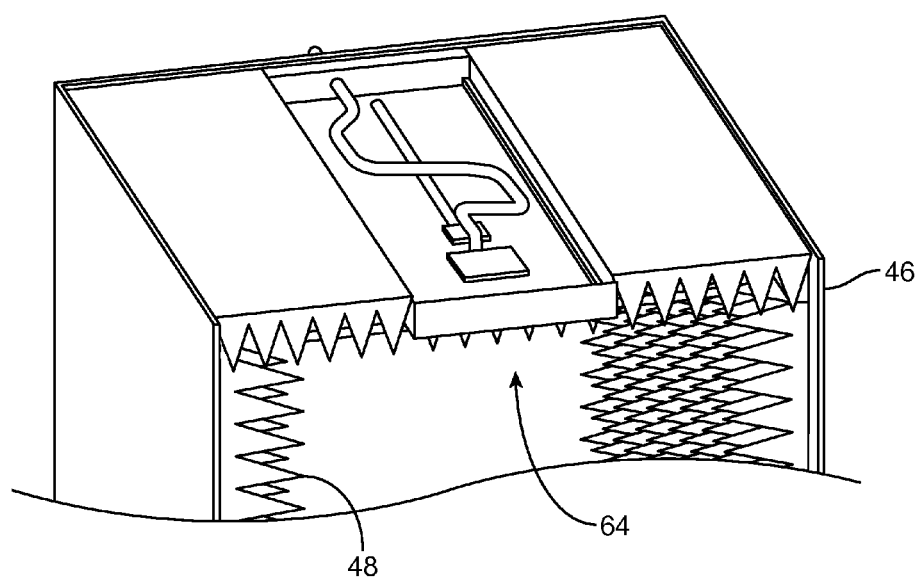
FIG. 9 is a cross-sectional perspective view of a test chamber with an adjustable antenna system in accordance with an embodiment of the present invention.

FIG. 9 is a top perspective view of chamber 46 (partly in cross section), showing how adjustable antenna system 64 may be mounted in the top of chamber 46 (as an example).

Figure 10:
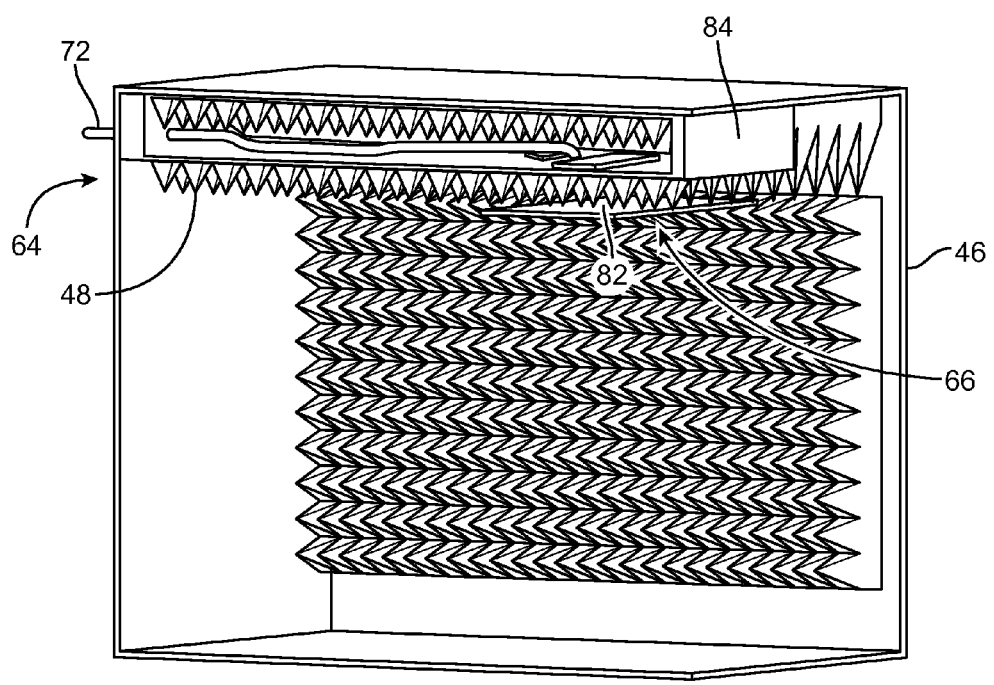
FIG. 10 is a cross-sectional perspective view of the test chamber of FIG. 9 showing how structures such as a rail in an adjustable antenna system may be shielded using radio-frequency absorbers in accordance with an embodiment of the present invention.

As shown in FIG. 10, adjustable antenna system 64 (e.g., rail 84 and some or all of support structures 82) may have an interior surface that is covered by pyramidal absorbers 48, while leaving antennas 66 exposed to the interior of chamber 46. This may help reduce signal reflections from antenna support structures 82 and 84 in adjustable antenna system 64.

Figure 11:
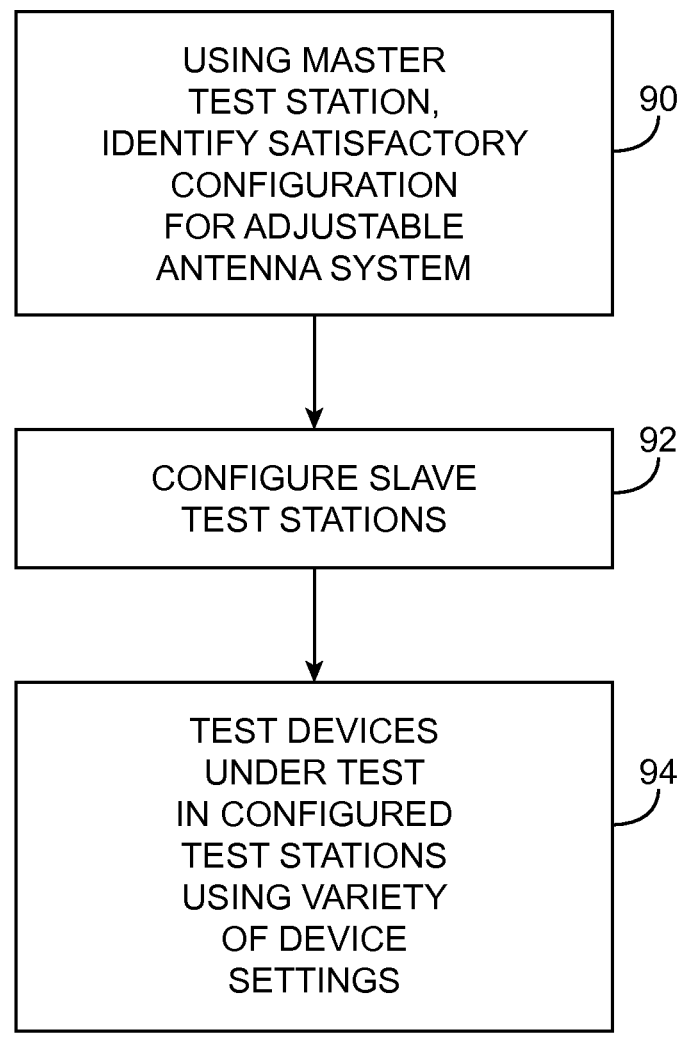
FIG. 11 is a flow chart of illustrative steps involved in using a test system with adjustable antenna structures to perform wireless tests on devices under test such as single-point over-the-air tests in accordance with an embodiment of the present invention.

Illustrative steps involved in testing devices under test using a test system such as test system 28 of FIG. 5 are shown in FIG. 11.

At step 90, devices under test 10 may be loaded into test stations 30. Master test station 30M may, in response to control commands from test equipment 60, make adjustments to antenna position using positioner 68 in adjustable antenna system 64, make adjustments to which antenna 66 is switched into use using switching circuitry 68B, and may make adjustments to the position of device under test 10 in master test station 30M using positioning system 50 (e.g., by rotating device under test 10 or otherwise moving device under test 10). For each different trial configuration for master test station 30M, test equipment 60 (e.g., test equipment 60 in master test station 30M) may make wireless test measurements such as receiver sensitivity measurements and other over-the-air measurements. The wireless test measurements allow test system 30M to identify a satisfactory test station configuration to use in testing device under test 10 when performing subsequent single-point (fixed antenna and device location) over-the-air wireless test measurements.

If device under test 10 is positioned poorly relative to the active test antenna, signal strength may be inadequate for making over-the-air tests. Due to changes in communications band frequencies and other parameters during testing of device 10, a single configuration for test system 30M may not generally be optimal for all desired tests. As a result, master test station 30M preferably makes adjustments to the configuration of master test station 30M for each different communication band (or other range of frequencies) to be tests. As an example, if it is desired to test device under test 10 in a 2.4 GHz wireless local area network communications band and to test device under test 10 in a 5 GHz wireless local area network communications band, test station 30M may make a series of adjustments to identify a first satisfactory configuration for performing single-point over-the-air tests in the 2.4 GHz band and will make another series of adjustments to identify a second satisfactory configuration for performing single-point over-the-air tests in the 5 GHz communications band.

Consider, as an example, a scenario in which it is desired to perform over-the-air test measurements on devices under test 10 using test system 28 of FIG. 5. It may be desired, for example, to measure receiver sensitivity in transceiver circuitry 42 in an operating scenario in which display 14 is active and in an operating scenario in which display 14 is inactive. It may be desirable to identify a test station configuration (e.g., a position for a test antenna) that maximizes or nearly maximizes signal strength during measurements. This configuration (i.e., this antenna location relative to chamber 46 and device under test 10) may then be used in making the over-the-air test measurements.

The test measurements that are made during the receiver sensitivity tests in slave test stations 30S may be made so that each slave test station's test antenna is located in a single location within the test chamber of the slave test station (i.e., the test antenna may be fixed at a single optimal location based on information on this location that is provided by the master test station). This type of single-position antenna measurement may be used in performing desense measurements, coexistence measurements, equivalent isotropically radiated power (EIRP) measurements, and effective isotropic sensitivity (EIS) measurements and other single-point over-the-air measurements.

During the operations of step 90, the master test station may step through each possible antenna 66. For example, the master test station may switch antenna 66A into use and perform measurements to determine how well signals are transmitted and received using antenna 66A, the master test station may then switch antenna 66B into use and perform measurements to evaluate antenna 66B, and the master test station may then switch antenna 66C into use and perform measurements to evaluate 66C. Using this type of systematic evaluation technique, the master test station can determine which of the three antennas 66 in master test station 30M produces optimum test results. While stepping through each of the available antennas, test station 30M may also step through each of a plurality of different potential positions for antennas 66 along longitudinal axis 90 of rail 84 and/or may step through a series of different angular orientations for device under test 10 using positioning system 50. After iterating over all desired candidate configurations for test station 30M, a satisfactory configuration for test station 30M and test stations 30S (e.g., an optimum configuration in which signal strength is maximized to ensure satisfactory over-the-air wireless tests) may be identified.

At step 92, the master test station may configure the slave test stations based on the test measurements made by the master test station. In particular, test equipment 60 may direct each slave test station 30S to use the optimum test station configuration that was identified at step 90. Test equipment 60 in the master test station may, for example, direct each slave test station 30S to move support structure 82 and antennas 66 to a particular longitudinal position along rail 84, may direct switching circuitry 68B to switch a particular one of antennas 66 into use, and may direct device under test positioning system 50 to position device under test 10 in the location that was identified during step 90. This will place all slave test stations 30S in test system 28 in the same optimum configuration for making satisfactory wireless single-point (fixed antenna location relative to the device under test) over-the-air test measurements with test equipment 60.

At step 94, each of the slave test stations tests a respective one of the devices under test after being configured by the master test station based on the test measurements of step 90. During the operations of step 94, test stations 30S may each use the satisfactory configuration in which they have been placed by test station 30M in performing wireless tests on devices under test 10. Test station 30M may also perform tests if desired. In each test station, the selected antenna 66 is preferably not moved during testing (i.e., the selected antenna is at a fixed location for performing over-the-air single point tests such as desense tests, coexistence tests, EIRP tests, and EIS tests). Test results can be analyzed and used during the manufacturing of devices 10. For example, pass-fail tests may be established by test system 28. If a particular device under test 10 does not exhibit a desired level of performance, the device may be deemed to have failed the test and can be reworked or scrapped. Devices under test 10 that exceed minimum performance requirements may be shipped to users.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of testing wireless electronic devices under test, comprising:
   in a master test station in which a device under test is located, adjusting an adjustable antenna system to identify a satisfactory position for an antenna in the adjustable antenna system for making test measurements on the device under test, wherein the adjustable antenna system comprises a plurality of antennas mounted on antenna support structures and a rail along which the antenna support structures are positioned, the rail has a slot along which the antenna support structures are positioned, and the adjustable antenna system comprises switching circuitry on the antenna support structures;
   with the switching circuitry, switching a selected one of the plurality of antennas into use;
   adjusting an adjustable antenna system in each of a plurality of slave test stations to place antennas in the adjustable antenna systems of the slave test stations in the satisfactory position; and
   while the antennas in the adjustable antenna systems of the slave test stations are in the satisfactory position, wirelessly testing respective devices under test in the slave test stations using the antennas in the adjustable antenna systems of the slave test stations.

2. The method defined in claim 1 wherein wirelessly testing the respective devices under test comprises performing single-point over-the-air measurements in which the antennas in the adjustable antenna systems of the slave test stations are in fixed positions relative to the respective devices under test.

3. The method defined in claim 1 wherein the adjustable antenna system in the master test station comprises an antenna support structure, a plurality of antennas mounted to the antenna support structure, and a positioner and wherein adjusting the adjustable antenna system in the master test station comprises positioning the antenna support structure with the positioner.

4. The method defined in claim 3 wherein the antenna system in the master test station comprises radio-frequency switching circuitry and wherein adjusting the adjustable antenna system in the master test station comprises switching a given one of the plurality of antennas into use with the radio-frequency switching circuitry.

5. The method defined in claim 4 wherein the slave test stations each include a positioning system on which the respective device under test in that slave test station is supported, the method further comprising rotating the respective device under test in each slave test station to a position for wireless testing based on information from the master test station.

6. The method defined in claim 5 wherein wirelessly testing the respective devices under test comprises performing single-point over-the-air measurements in which the antennas in the adjustable antenna systems of the slave test stations are in fixed positions relative to the respective devices under test.

7. A wireless test system for testing radio-frequency transceiver circuitry in devices under test, comprising:
   a master test station having test equipment and having a test chamber that contains an adjustable antenna system that is coupled to the test equipment of the master test station, wherein the test chamber receives a given one of the devices under test;
   a plurality of slave test stations each of which has test equipment and a test chamber that contains an adjustable antenna system that is coupled to the test equipment of the slave test station, wherein each test chamber receives a respective one of the devices under test, the master test station is operable to configure the slave test stations based on test measurements made on the given one of the devices under test with the master test station and wherein each of the plurality of slave test stations is operable to test the respective one of the devices under test in the test chamber of that slave test station after being configured by the master test station based on the test measurements, and the adjustable antenna system in the master test station comprises a plurality of antennas on antenna support structures; and
   a rail in the adjustable antenna system of the master test station with a slot along which the antenna support structures are positioned, wherein the adjustable antenna system in the master test station comprises switching circuitry on the antenna support structures that is configured to switch a selected one of the plurality of antennas into use.

8. The wireless test system defined in claim 7 wherein the adjustable antenna system in the master test station comprises a positioner that positions the antenna support structures.

9. The wireless test system defined in claim 8 wherein the antennas comprise patch antennas.

10. The wireless test system defined in claim 9 further comprising pyramidal absorbers that cover at least part of the rail.

11. The wireless test system defined in claim 10 wherein the adjustable antenna system in each slave test chamber has at least three antennas and wherein the adjustable antenna system in each slave test chamber has switching circuitry that is configured to switch a selected one of the three antennas into use.

12. The wireless test system defined in claim 11 wherein each of the slave test stations includes a positioning system that positions the respective one of the devices under test in that slave test station.

13. The wireless test system defined in claim 12 wherein the positioning system in each slave test station includes a rotatable platform and a positioner that rotates the platform, wherein the respective one of the devices under test in each slave test station is supported on the rotating platform in that slave test station.

14. The wireless test system defined in claim 8 wherein the positioner comprises a pneumatic positioner that moves the antenna support structures.

* * * * *